Dec. 15, 1925.                                          1,565,858
                          D. M. LEWIS
       METHOD OF AND APPARATUS FOR CONTROLLING BACK PRESSURE
                     AND DRAFT IN LOCOMOTIVES
                     Filed April 15, 1920        8 Sheets-Sheet 4

Dec. 15, 1925.  1,565,858
D. M. LEWIS
METHOD OF AND APPARATUS FOR CONTROLLING BACK PRESSURE
AND DRAFT IN LOCOMOTIVES
Filed April 15, 1920     8 Sheets-Sheet 5

WITNESS.
Gustav Genglinger.

INVENTOR.
David M. Lewis
BY
ATTORNEYS.

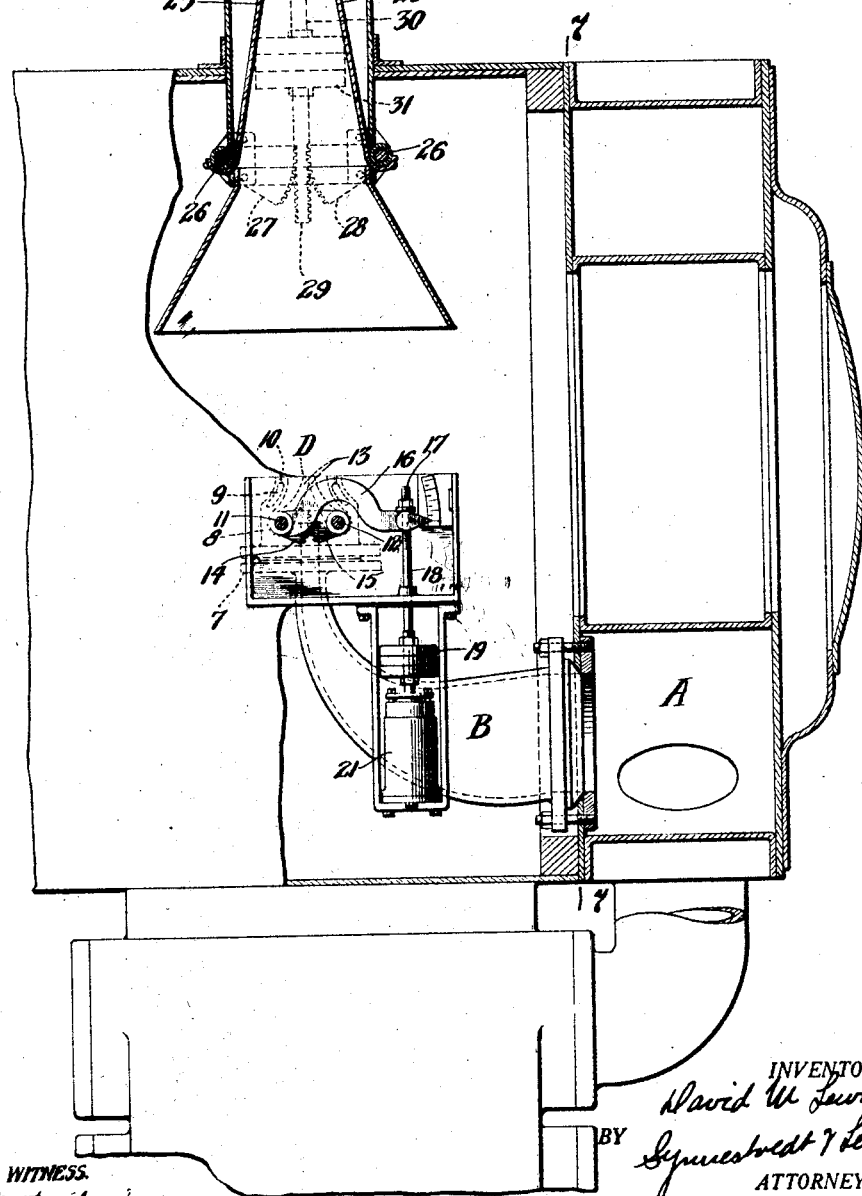

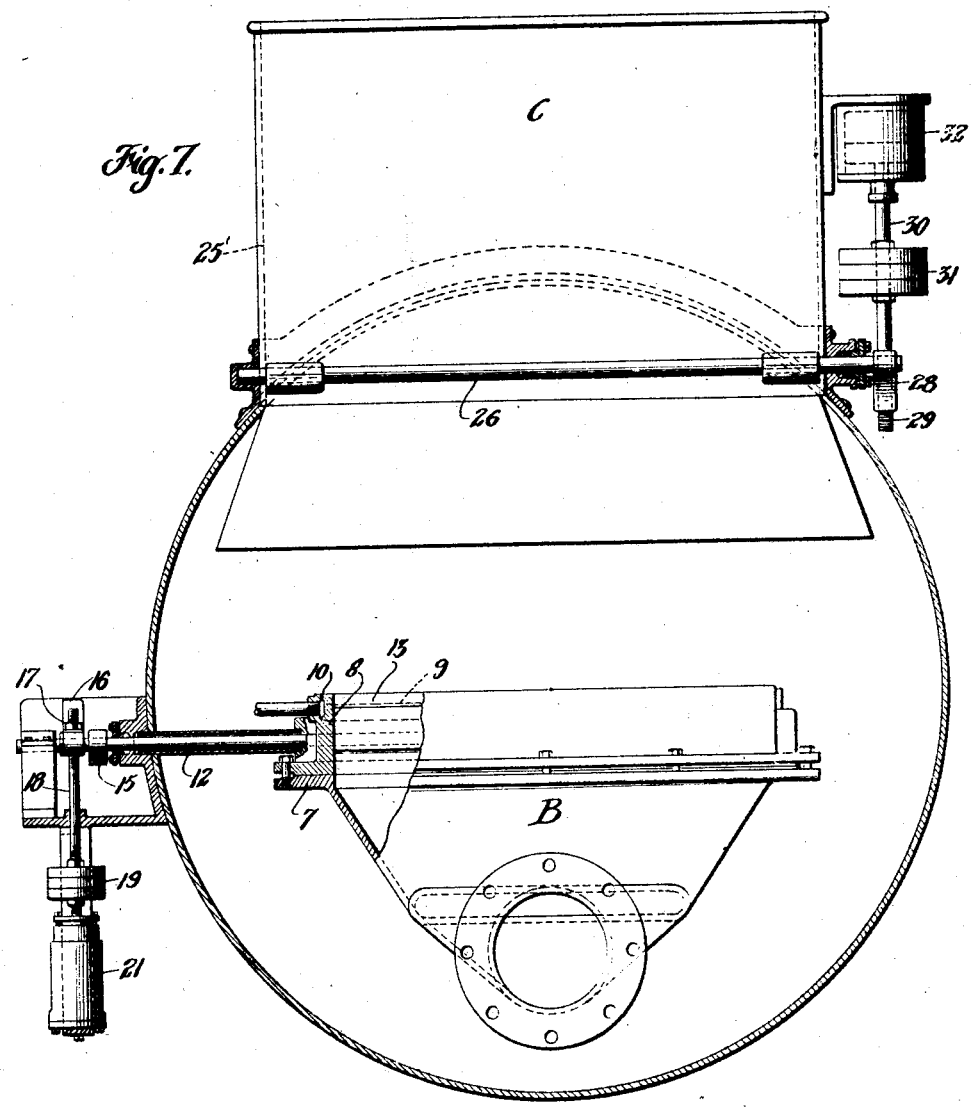

Dec. 15, 1925.  1,565,858
D. M. LEWIS
METHOD OF AND APPARATUS FOR CONTROLLING BACK PRESSURE
AND DRAFT IN LOCOMOTIVES
Filed April 15, 1920  8 Sheets-Sheet 8
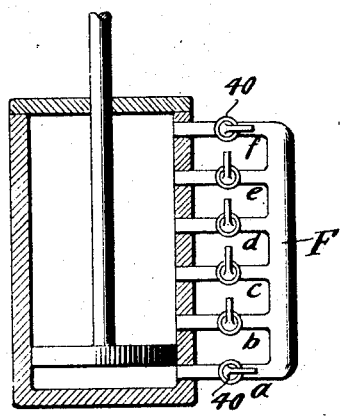
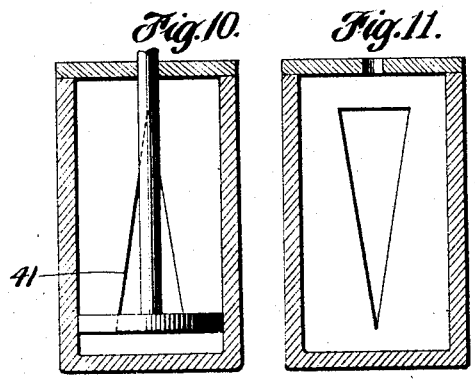
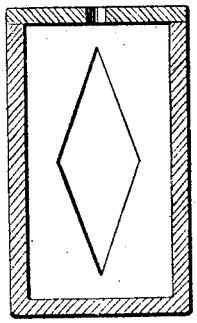
INVENTOR.
David M. Lewis
BY
ATTORNEYS.
WITNESS.

Patented Dec. 15, 1925.

1,565,858

UNITED STATES PATENT OFFICE.

DAVID MILLER LEWIS, OF MILWAUKEE, WISCONSIN, ASSIGNOR TO LEWIS DRAFT APPLIANCE COMPANY, A CORPORATION OF ILLINOIS.

METHOD OF AND APPARATUS FOR CONTROLLING BACK PRESSURE AND DRAFT IN LOCOMOTIVES.

Application filed April 15, 1920. Serial No. 374,019.

*To all whom it may concern:*

Be it known that I, DAVID MILLER LEWIS, a citizen of the United States, residing at Milwaukee, in the county of Milwaukee and State of Wisconsin, have invented certain new and useful Improvements in Methods of and Apparatus for Controlling Back Pressure and Draft in Locomotives, of which the following is a specification.

This invention relates to a method of and apparatus for automatically controlling or governing the back pressure and the draft in a steam locomotive, and it has for its primary object the attainment of any desired automatic control or regulation within practical limits of the back pressure or the draft or both. Another important object of the invention is the reduction of back pressure to a point much below that obtained in present practice.

Still another object of my invention resides in the provision of an improved method of and apparatus for controlling or regulating the draft by means of which the locomotive can be readily and simply adapted to any class of service, different kinds of fuel and other conditions which may be encountered.

My invention also contemplates the provision of an improved method and means whereby the efficiency of existing types of locomotives may be greatly improved at minimum expense.

In general, I propose by the present invention, to increase the efficiency of a locomotive of any type by the reduction in down stack losses, fuel losses out of the stack, and in the amount of water consumed, as well as by improved combustion, prevention of carbonization, flue stoppage and the like.

Figure 1:
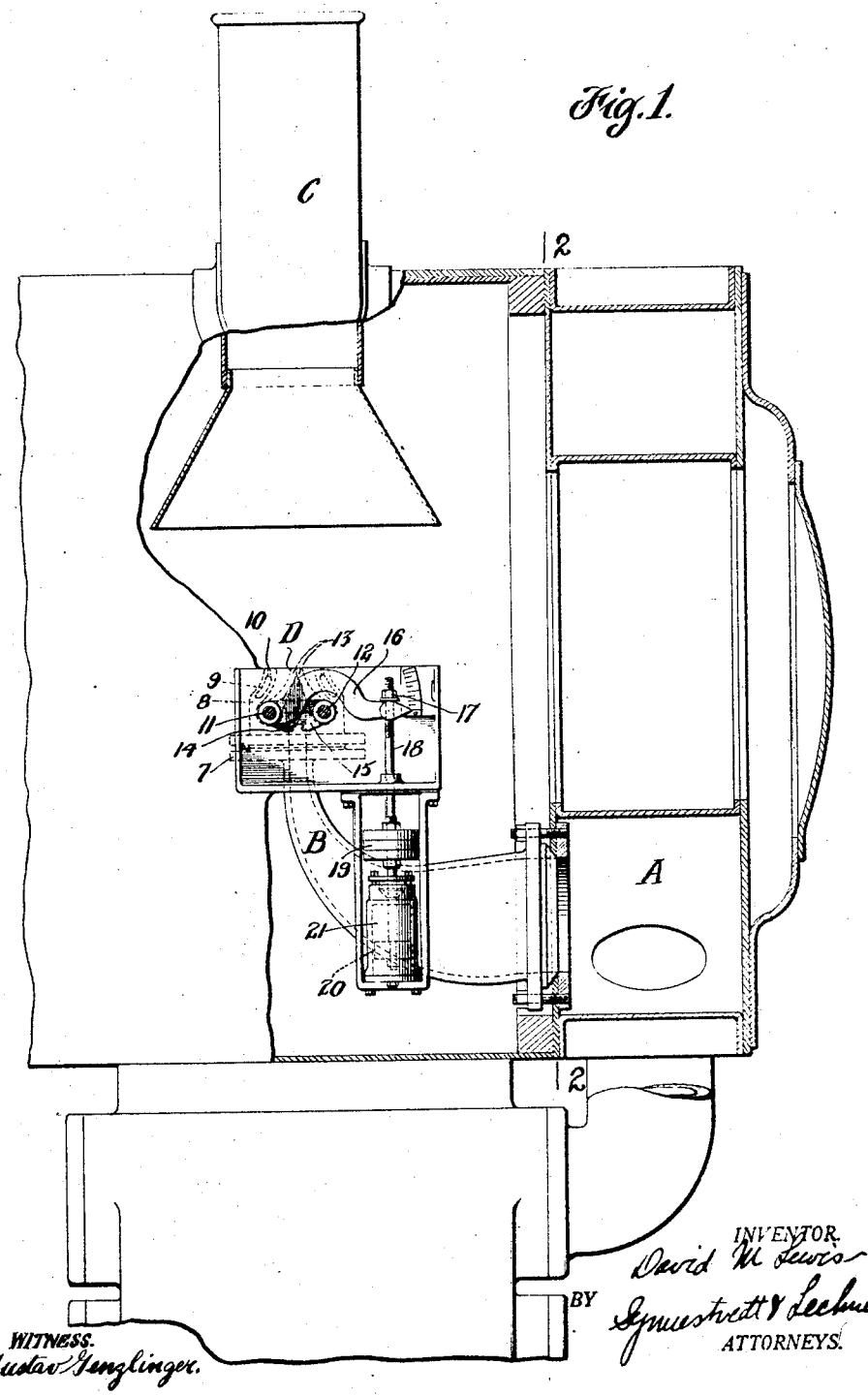
Figure 2:
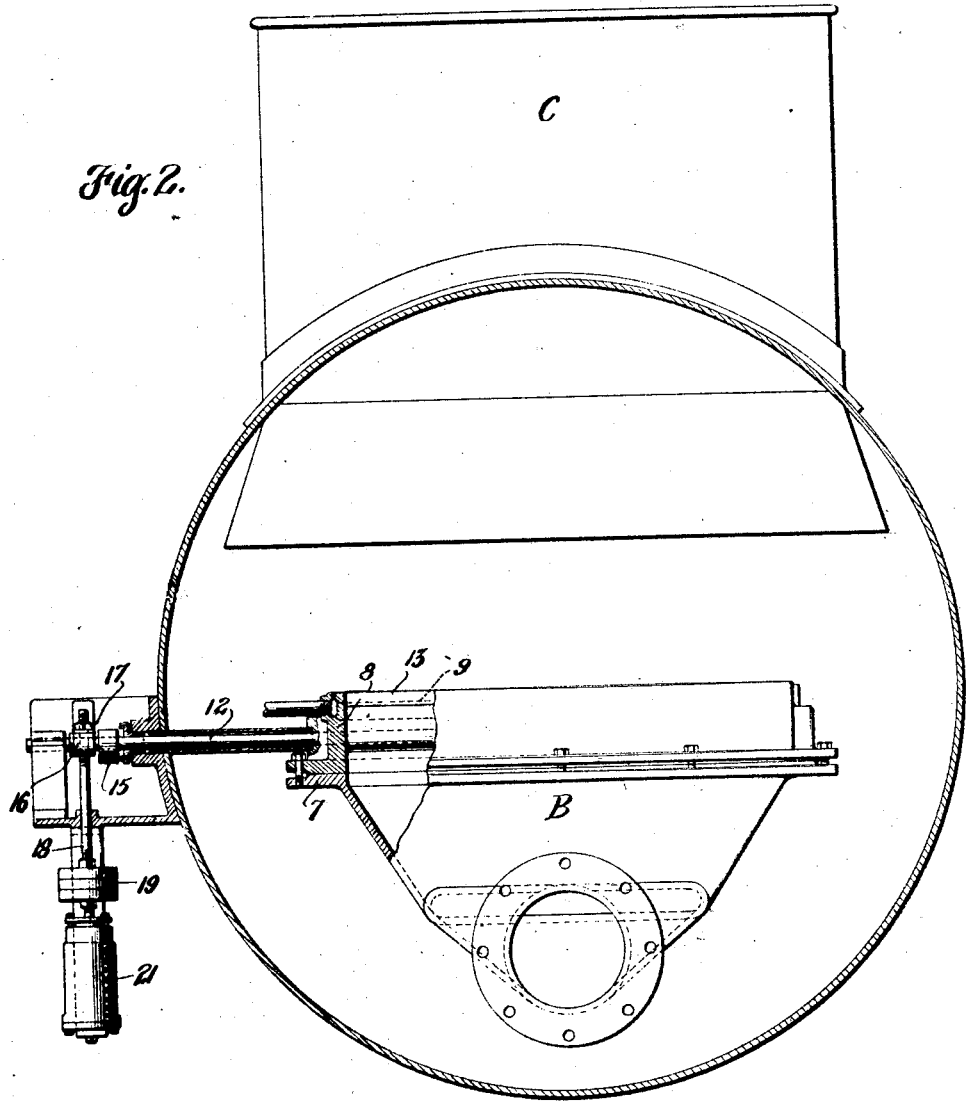
Figure 3:
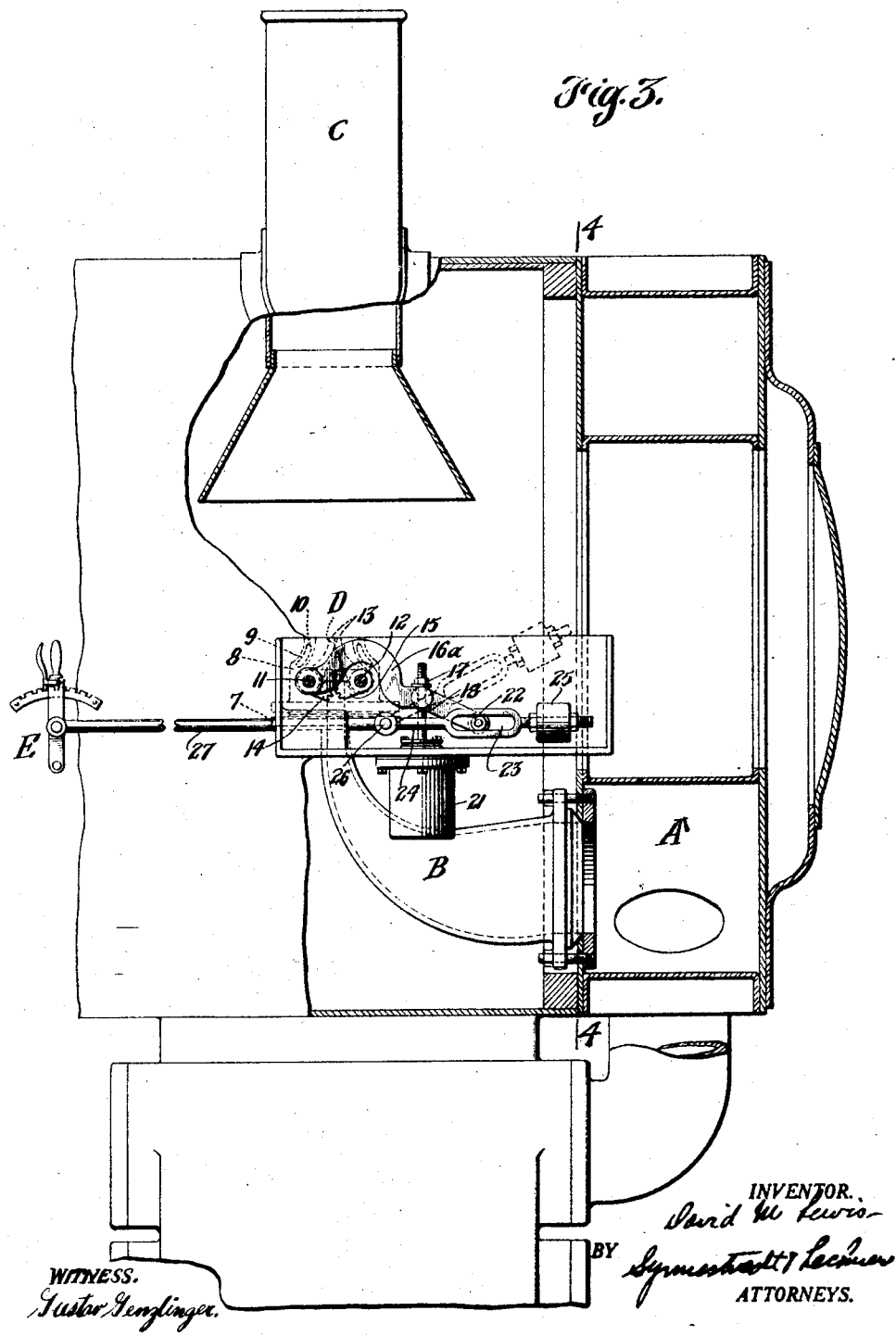
Figure 4:
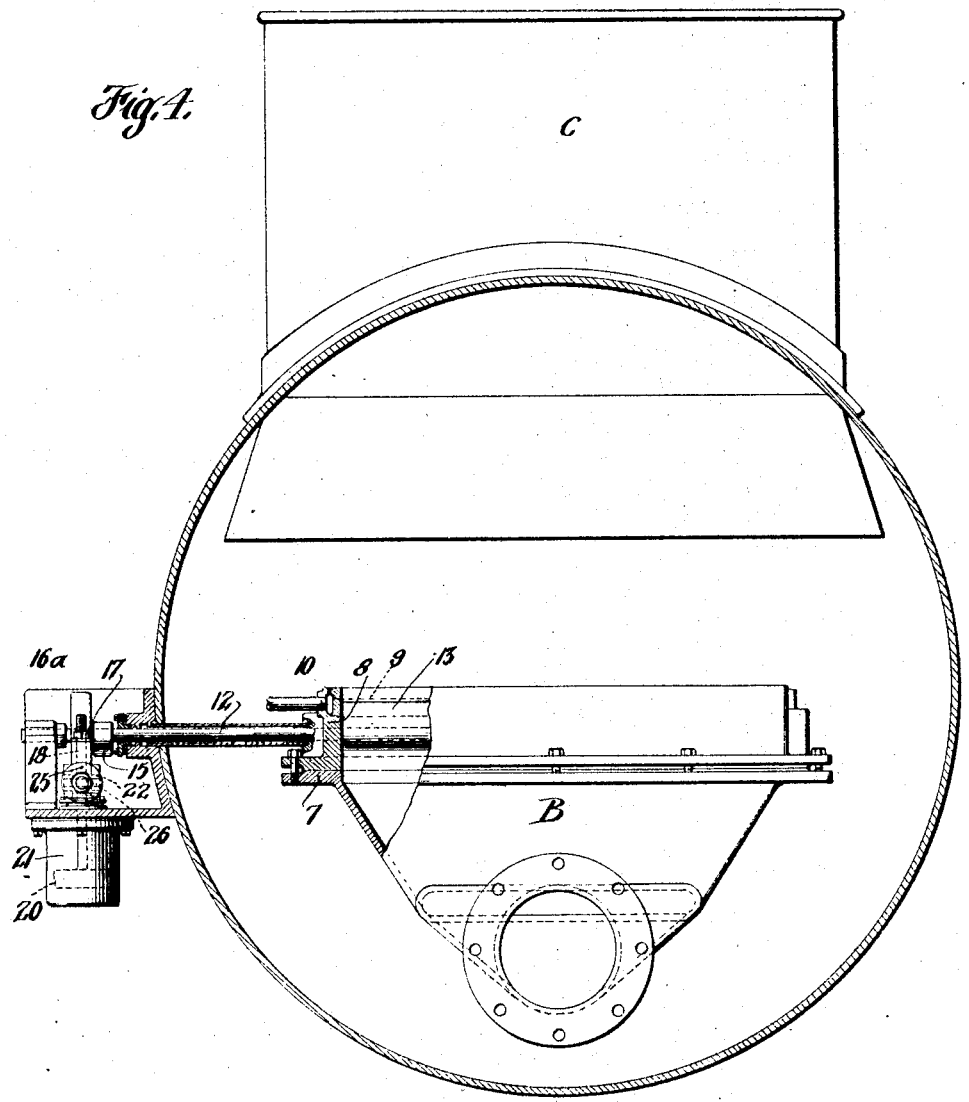
Figure 5:
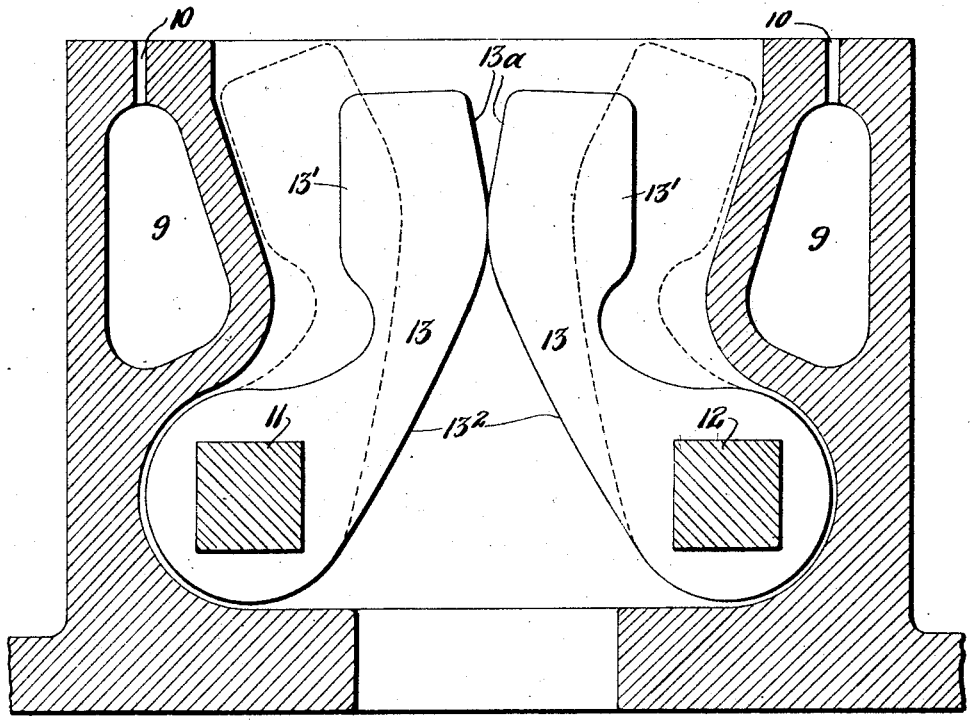
Figure 8:
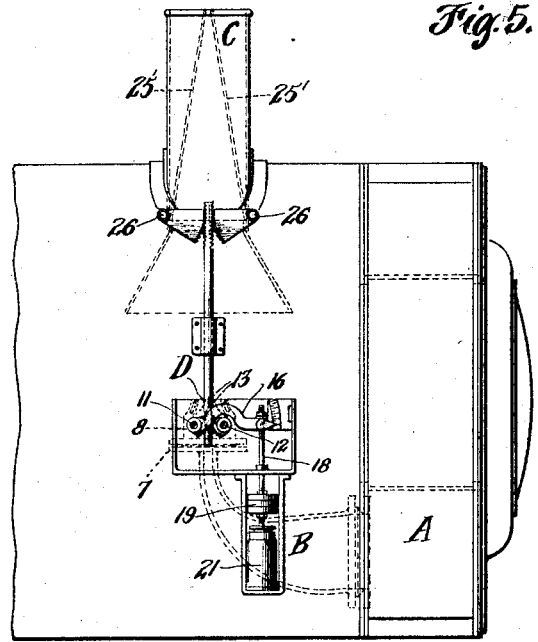

The foregoing fundamental objects together with such other objects as may hereinafter appear, or are incident to my invention, I obtain by means of a method and apparatus illustrated in preferred form in the accompanying drawings, wherein:

Figure 1 is a longitudinal section through the front end of a locomotive equipped with my improvement; Figure 2 is a section taken on the line 2—2 of Figure 1; Figure 3 is a sectional view corresponding to Figure 1, but illustrating a modification of my invention; Figure 4 is a cross section taken on the line 4—4 of Figure 3; Figure 5 is an enlarged sectional view of a detail constituting another modification of my invention; Figure 6 is a diagrammatic section through a front end illustrating an improved stack forming a part of my invention; Figure 7 is a section taken on the line 7—7 of Figure 6; Figure 8 is a side elevation showing another modification of my invention; and Figures 9 to 12 inclusive are diagrammatic sectional views illustrating modifications of the dash pot mechanism shown in the figures.

My invention involves, among other things, the utilization of the pressure conditions obtaining on the exhaust side of the cylinder or cylinders to effect an automatic regulation of either the back pressure itself, the draft, or both, and it is therefore, generally applicable to all locomotives. In present practice the enginemen have control of steam admission only, and they have no control over exhaust which takes place through a fixed orifice, necessarily involving a large range of draft and back pressure differentials. In carrying out my invention, I provide what I term an automatic controller or governor which is automatically actuated by the exhaust pressure conditions themselves and which sensitively responds, in substantially any desired degree or manner, to changes in such conditions, so as to produce the required regulation of the draft and back pressure. The foregoing will more fully appear in connection with the following detailed description of my improvements.

In the embodiment of my invention shown in Figures 1 to 4 inclusive, I employ my improvements in combination with a large volume stack C and with an expansion chamber A to which the exhaust is led through exhaust passages, preferably of maximum cross sectional area, and where it expands, the purpose of the expansion chamber being to permit of the creation of a substantially continuous draft blast of large volume, low velocity and low pressure in contra-distinction to the sharp, intermittent, high pressure, low volume draft of standard practice. This produces great efficiency because of the low back pressure and other advantages incident to this arrangement, but I find that I can still further reduce the back pressure, and secure even more effective draft, and therefore, greater economy and efficiency, by applying thereto my present improvements.

My improved governor which I have designated as a whole by the reference letter D and which I substitute for the nozzle top of standard practice, is applied as follows: The base B which is widened at the top transversely of the box is provided at its top with a flange 7, and a housing 8 is bolted thereto, such housing being provided with the blower channel 9 and jets 10. The base B conducts the steam from the expansion chamber and it is widened at the top, preferably in proportion as the side walls are brought together so that the area is substantially equal throughout. (See Figures 1 and 2.) Two shafts 11 and 12, are mounted in the housing, as will further appear, said shafts extending transversely thereof and being provided with the controller or governor vanes 13, which create the jet. The shaft 11 is provided with a gear segment 14 which meshes with a similar segment 15 on the shaft 12, the function of which is to cause the vanes to operate in unison, as will hereinafter be set forth.

The vanes 13 are normally held in the closed position shown by a yielding means, such, for example, as the arm 16 which is keyed, or otherwise non-rotatively associated with the shaft 11, and is weighted in any manner as desired by the weights 19 on the stem 18 which may be connected in any desired manner to the arm.

Secured to the lower end of the stem 18 is a piston 20 of a dash pot 21, the dash pot being preferably filled with oil and the piston fitting loosely enough to provide the necessary leakage. Among other things the dash pot serves to cushion the movements of the vanes 13, and may be utilized to otherwise control their operation.

The operation of this form of governor means is as follows: Assuming that the vanes are in the closed position shown, and the reverse lever is in the corner, when steam is admitted to the cylinders, and exhaust takes place the exhaust steam enters the expansion chamber A and there expands and the pressure in the expansion chamber and in the governor base builds up until it is sufficient to overcome the effect of the weight 19, at which time the vanes open up preventing the building of pressure above a predetermined, selected value. The pressure required to open the vanes will be predetermined, in this instance, by the draft desired at lower speeds, the stem 18 being accordingly weighted. If the desired draft at such speeds will be produced by a jet pressure of say a maximum of four pounds, the weights 19 will be adjusted so as to permit of the vanes to open at a less pressure, for I have found that less pressure will suffice to initially open the vanes than is necessary to hold the vanes in opened position when the steam operates less effectively on the inner faces of the vanes because of the change in their angularity and the leverage of the vanes themselves is less effective. Therefore, when the pressure in the expansion chamber has built up to say for example, two pounds or a little more, the vanes will open, but the pressure must build up to four pounds before the vanes can be fully opened and maintained opened. With four pounds jet pressure it will be obvious that the back pressure will also be substantially four pounds which, it will be understood by those skilled in the art, is remarkably low considering that adequate draft is maintained. As the speed increases and the engineman cuts back or shortens the cut off, the steam is being used more or less expansively in the cylinders and the pressure in the expansion chamber and governor base or stand decreases somewhat below what it was when the steam was being used at slower speeds in larger volumes unexpansively, at which time the exhaust steam is at high pressure. As a result, the pressure at the governor is correspondingly lower and the vanes respond to the difference in pressure and automatically are brought closer together by the weights 19, thus decreasing the size of the jet opening. However, the draft at the higher speeds is somewhat less than at lower speeds. The back pressure is, of course, correspondingly reduced and the very novel condition of decrease in back pressure on increasing speeds obtains which is just the opposite of standard practice. In certain classes of service this character of drafting may be desired.

Assuming now that it is desired to have the locomotive drafted substantially uniformly at all operating speeds, with a uniform back pressure. To produce such a result I provide means of a differential character which will affect the vanes in such manner as to produce a substantially constant jet pressure, automatically, irrespective of working conditions, at the same time maintaining constant back pressure. One form of such compensating means is illustrated in Figures 3 and 4, from inspection of which it will be seen that the arm 16ª, corresponding to the arm 16 of the device shown in Figures 1 and 2, is provided with a pin 22 adapted to work in a slot 23 in a rod 24, to one end of which is adjustably threaded a weight 25, the other end of the rod being pivoted, as at 26, to another rod 27 leading back to the cab and attached to an adjusting lever and quadrant mechanism E. The operation of the weight 25 and its effect on the vanes is as follows: When the vanes are opened, say, for example, to approximately full open position, the weight 25 will be shifted to the position indicated in dotted lines and, therefore, owing to decreased leverage it is least effective in opposing the pressure holding the vanes open. At the wider open position of the vanes, the weight should be least effective for the reason, as pointed out before, that it takes more pressure to hold the vanes open, this probably either because of the change in angularity of the vanes or because of a difference between static and flow pressure, or both. As the vanes, however, are brought closer together, for similar reasons, it takes less pressure to hold them open, and, therefore, the pressure in the governor base and volume chamber, as well as in the exhaust side of the cylinders would be correspondingly lower and would not produce the desired constancy of draft unless the size of the jet opening were differentially restricted so as to cause the pressure to build up on the exhaust side to the desired preselected value. This result is brought about, as closing movement occurs, by the change in the leverage and, therefore, the increase in effectiveness of the weights 25, such effectiveness increasing as the vanes approach full closed position. Thus it will be seen that the effect of the differentially operating weight 25 is to cause the vanes 13 to act after the manner of a governor or controller automatically compensating to restore and maintain the jet pressure and the back pressure at the predetermined value necessary to secure the selected constant draft.

As another means which may be employed in securing the above results, I may provide a weighted vane construction, such as shown, for example, in Figures 5 and 8, the operation of which will be hereinafter more fully set forth.

The function of the mechanism E and the rod 27 is to alter the pivot point of the weight 25 and thus lengthen or shorten the leverage of the arm 24 thereby increasing or decreasing the controlling or major weight 25, the object in view being that the engineman can set a new standard in the degree of draft and back pressure, without, however, disturbing the automatic compensating operation of the weights. Thus if particular conditions or the particular class of service require a higher or a lower degree of draft, the engineman, from the cab, can manually adjust the mechanism so as to cause the controller to operate to secure such degree of draft. To specifically illustrate the foregoing, if the engine began to leak and the previously selected standard of draft was insufficient to draft the engine, the engineman would simply shift the mechanism to increase the leverage of the weight 25. The same would be done in cases where a bad tank of fuel was had or other adverse conditions obtained. This feature of the invention is also advantageous in shifting the locomotive from one class of service to another. It will, of course, be understood, that the desired results can be obtained in a variety of different ways and that this feature is applicable to all the types of apparatus shown in the drawings and coming within the spirit of this invention.

Referring now to the construction shown in Figure 5, I have therein illustrated another manner in which the compensating effect of the arrangement shown in Figure 3 may be had. According to this modification I weight the vanes 13, as for example, by increasing the top portion thereof, as indicated at 13', correspondingly changing the shape of the housing 8. When the vanes are in full open position, as shown in dotted lines in this figure, it will be noted that the weight is least effective and becomes more and more effective as the vanes move from the dotted position toward closed position, whereby substantially the same results are secured as in the mechanism shown in Figure 3. I prefer to construct the vanes in such manner that the inner faces $13^2$ of the vanes when in full open position very closely approximate the vertical, the upper portion $13^3$ of such surface being divergent both in full closed and partially open positions. In all partially open positions, therefore, something akin to a Venturi tube opening is secured and the greatest divergence of the steam leaving the vanes is obtained. This is desirable for the reason that at partially open position, the divergence is needed in order to properly fill the stack to maintain the proper amount of draft. However, in full open position, the Venturi tube effect is practically annulled, since the surfaces $13^2$ are practically vertical, and the stack is filled to the proper amount by the larger column of steam delivered.

The weighting of the vanes 13 may be fixed so as to secure the same constancy in draft and back pressure as the construction shown in Figure 3, or the vanes may be overweighted in order to secure greater draft at higher speed than at lower speed.

The operation of the overweighted vane construction is as follows: At slow speed, with the lever in the corner, and the engine working hard the large volumes of high pressure exhaust steam will open the vanes to a point where the weights are least effective and the pressure will only build up to the point necessary to hold the vanes open. As the speed increases and the reverse lever is cut back and the engine is beginning to use the steam expansively, the reduction in pressure on the exhaust side of the cylinders permits the major weight to move the vanes toward closed position, immediately making the weighted vanes more effective and since they are overweighted the result is that the opening is restricted to a point at which the pressure builds up to produce the required higher value of draft. This produces higher draft at higher speeds and although the back pressure is somewhat increased over what it would be at low speed, nevertheless it is relatively a very low back pressure. This arrangement will be found suitable where it is desired to have a high sustained boiler power at high speed, as would be very advantageous in Mallet's and other compounds, for example, or in all other units which have high starting values.

It will thus be seen that by my automatic governor operated by the pressure of the exhaust steam itself, I am enabled to obtain any desired degree of draft and back pressure within the total limits of the working of the engine and this with the great increase of efficiency which must result from the operation set forth.

The dash pot mechanism shown in Figures 1 to 4 operates, as before pointed out, to cushion the vanes in their opening movement and their closing movement, but if desired its effect may be modified, as for example, by only partially filling the chamber with oil when it would act to permit greater freedom of opening movement, whereas if the chamber is completely filled with oil the movements are uniform throughout.

It may be found in some instances to be desirable to supplement the automatic draft and back pressure governor by a stack which automatically accommodates itself to the operation of the draft governor, increasing its area and volumetric capacity when the vanes are open and decreasing its area and volumetric capacity when the vanes close, in order that at all times the stack may be properly filled. I accomplish the desired result by providing two vanes 25′ secured at their lower ends to a shaft 26, the shafts being operatively connected so as to rotate in unison by means of the gear segments 27, 28 and the rack 29 which is secured to a stem 30 weighted by the weights 31 and controlled in its movement by a dash pot 32, as before. By means of this construction the vanes automatically operate in accordance with the stack pressure conditions. If desired, the stack vanes and the governor may be coupled together so as to operate in predetermined relation. As one means for accomplishing this result rack 29 may be continued down to mesh with the gear segments 14 and 15, as shown in Figure 8. It will, of course, be understood that where such an arrangement is employed but one set of weights and one dash pot will be used and the stack would be directly operated by or controlled from the governor.

In so far as carbonization is concerned, it will be immediately apparent that when steam is cut off from the cylinders the vanes will automatically close preventing the indraft of the products of combustion from the front end into the cylinders.

With respect to the construction shown in Figures 1 to 4, in so far as carbonization is concerned, it will be noted that the indraft of the hot gases from the front end will be eliminated, and in addition, as soon as steam is cut off from the cylinders the latter will be immediately cooled by virtue of the large volume of steam which will be contained in the expansion chamber at low pressure and, therefore, high moisture. This wet steam will be drawn back into the cylinders and will immediately operate to cool the same.

It will be observed that by the use of my improvements, since draft and back pressure are governed automatically, unskillful handling of the engine on the part of the engineer and fireman will not produce nearly as detrimental results as it otherwise would. Thus, for example, if the engineer is operating at the wrong cut-off for the particular speed, he will only waste steam and not increase back pressure, whereas, in standard practice not only is there a waste of steam but there is a high back pressure.

Furthermore, there will be no excessive high draft conditions, such for example, as are present during slippage or in switching where the engine is not properly hooked back, because the governor will accommodate itself to such conditions, the net result being that the fire will not be pulled out, as frequently happens under such conditions in standard practice. It will be seen from the foregoing that at no time will there be any large volumes of chilling air drawn into the fire box, which retards combustion and cools the fire box, producing among other things, contraction and leaks.

The continuous blast obtained in the construction first described is also of great value in connection with oil burning locomotives as it eliminates the explosive action occurring in the fire box between draft pulsations, and in a pulverized fuel burning locomotive better conditions are maintained for the proper combustion of the fuel.

In certain instances, it may prove desirable to have the dash pot mechanism constitute a part of the governor means, working either in conjunction with it or in opposition to the major or supplementary weights. Such arrangement is shown in Figure 9 wherein I provide a manifold F having a plurality of ports $a$, $b$, $c$, $d$, $e$, $f$, etc., depending upon the number thereof, each of said ports being controlled by a cock 40, the ports being adapted to be covered and uncovered by the piston. If the ports $f$ and $a$ are open and the cocks for the remaining ports be closed, the piston will be cushioned at extremes of movement but its intermediate motion will be free, the oil or other cushioning fluid being free to circulate from one face of the piston to the other until cut off by the piston. If the ports e and d only are open, the dash-pot action will be increased in length and the free movement decreased, and if only the ports d and c are open, the free movement will be still further decreased and the dash-pot action increased. It will be seen that such an arrangement of the dash pot will permit of substantially any rate of acceleration of the vanes desired, as well as any degree of restriction of the freedom of movement. The same result might also be obtained by variously arranged ports formed in the wall of the cylinder, as shown in Figures 10, 11 and 12. Thus in Figure 10, the port 41 will produce a free movement of the piston initially, such movement being gradually restricted until at the upper limit of movement the piston will be checked. In Figure 11 the opposite results are obtained and in Figure 12 the initial movements are restricted, the freedom of movement gradually increasing and then decreasing toward the opposite extreme of movement.

From the foregoing description of my improved apparatus it will be seen that my method consists in automatically governing the draft and back pressure through the medium of the back pressure condition obtaining on the exhaust side of the piston.

In order to prevent leaks, I prefer to enclose the shafts operating the respective vanes in pipes 50, the inner ends of which are preferably welded while the outer ends passing through the shell have a slide fit in a plate arranged exteriorly of the shell and provided with a stuffing box 51. In addition to preventing leakage, the arrangement accommodates itself to expansion and contraction of the parts.

I claim:

1. The combination in a locomotive drafted by its exhaust steam, of means operating to change the intermittent exhaust from the cylinders into a substantially continuous draft blast, and a governor for regulating the draft blast.

2. The combination in a locomotive drafted by its exhaust steam, of means operating to change the intermittent exhaust from the cylinders into a substantially continuous draft blast, and a governor for regulating the draft blast to maintain the back pressure within predetermined limits.

3. The combination in a locomotive drafted by its exhaust steam, of means operating to change the intermittent exhaust from the cylinders into a substantially continuous draft blast, and a governor for regulating the draft blast, said governor being responsive to exhaust pressure conditions.

4. The combination in a locomotive drafted by its exhaust steam, of means operating to change the intermittent exhaust from the cylinders into a substantially continuous draft blast, and a governor for regulating the draft blast, said governor being responsive to change in pressure conditions brought about by change in working conditions.

5. The combination in a locomotive drafted by its exhaust steam, of mechanism for changing the intermittent exhaust from the cylinder into a substantially continuous draft blast, including means responsive to changes in pressure conditions and adapted to maintain the back pressure within predetermined upper and lower limits.

6. The combination in a locomotive drafted by its exhaust steam, of mechanism for controlling the exhaust blast subjected to and responsive to changes in pressure conditions and a governor for steadying the movement of said controlling mechanism.

7. In a locomotive, an exhaust stand, pivoted vane means, an arm therefor, a weight on said arm and a dash pot coupled to the arm.

8. In a locomotive, an exhaust stand, pivoted vane means, an arm therefor, a weight on said arm, and a dash pot coupled to the arm operating to check the closing movement of the vane means.

9. In a locomotive, an exhaust stand and a pair of weighted pivoted vanes forming the nozzle opening, the said stand being enlarged at the top to form a housing for the vanes.

10. The combination in a locomotive of an exhaust stand provided with movable means creating the jet opening, said means being responsive to the exhaust pressure to vary the opening in accordance therewith, said movable means being weighted to operate differentially.

11. The combination in a locomotive of an exhaust stand, pivotal vanes on the stand adapted to create the jet opening, and a differentially operating weight normally operating to close the vanes.

12. The combination in a locomotive, of means creating a draft jet and operating automatically in response to variations in exhaust conditions, and means for changing the area of the stack automatically actuated in accordance with such conditions.

13. The combination a locomotive, of a stack and governor means automatically changing the discharge area of the stack and responsive to change in pressure conditions.

14. The combination in a locomotive of an exhaust stand provided with movable means creating the jet opening, said means being responsive to the exhaust pressure to vary the opening in accordance therewith, a shaft for said movable means extending through the shell, a pipe enclosing said shaft having at least at one end a sliding fit in the adjacent structure, and a packing means.

15. The combination in a locomotive, of an exhaust stand provided with movable means creating the jet opening, said means being responsive to the exhaust pressure to vary the opening in accordance therewith, a shaft for said movable means extending through the shell, and a weighted arm for said shaft exterior of the shell.

16. The combination in a locomotive of an exhaust stand provided with movable means creating the jet opening, said means being responsive to the exhaust pressure to vary the opening in accordance therewith, a shaft for said movable means extending through the shell, an arm for said shaft exterior of the shell, and a dash pot connected to said arm.

17. The combination in a locomotive of an exhaust stand provided with movable means creating the jet opening, said means being responsive to the exhaust pressure to vary the opening in accordance therewith, a shaft for said movable means extending through the shell, and a pipe through which the shaft passes.

18. The combination in a locomotive drafted by its exhaust steam, of means for changing the intermittent discharge from the cylinders into a substantially continuous draft blast, and a servo-governor for regulating said draft blast so as to always ensure adequate draft but to maintain the back pressure below a predetermined value.

19. The combination in a locomotive, of means for varying the exhaust steam jet and means for varying the area of the stack, said means being automatically responsive to changes in pressure incident to change in working conditions.

20. The combination in a locomotive, of means creating a draft jet and operating automatically in response to variations in exhaust conditions, and means for changing the area of the stack.

21. The combination in a locomotive drafted by its exhaust steam, of means operating to change the intermittent exhaust from the cylinders into a substantially continuous draft blast, and governor means for regulating the back pressure having steadying means, said governor being automatically responsive to operating conditions.

22. The combination in a locomotive, of a steadied governor means for regulating the draft blast automatically responsive to operating conditions.

23. The combination in a locomotive, of an automatic governor having steadying means for regulating the exhaust, said governor being automatically responsive to exhaust pressure conditions.

24. The combination in a locomotive drafted by a jet of exhaust steam, of servo-governor means automatically regulating the jet pressure and responsive to variations in the conditions in pressure on change in working conditions.

25. The combination in a locomotive drafted by a jet of exhaust steam, of steadying servo-governor means for regulating the exhaust to a predetermined standard, said governor being responsive to change in pressure on change in working conditions, and means for altering the action of the governor to obtain a different standard.

26. The herein described process of drafting a locomotive which consists in changing the intermittent exhaust from the cylinders into a substantially continuous draft blast and in maintaining the back pressure of said blast within predetermined limits by utilizing the back pressure to adjust the blast opening larger or smaller as may be necessary.

In testimony whereof, I have hereunto signed my name.

DAVID M. LEWIS.